Oct. 24, 1950 J. A. SCHLENZ 2,527,155
HITCH FOR TRAILERS
Filed Aug. 17, 1948 2 Sheets-Sheet 1
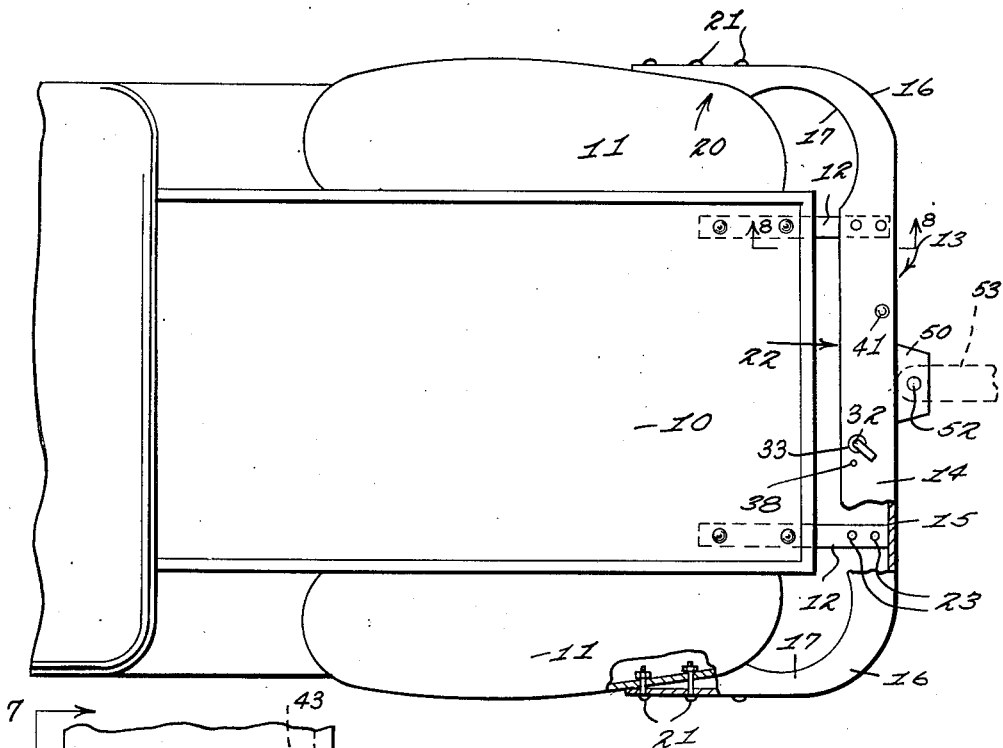
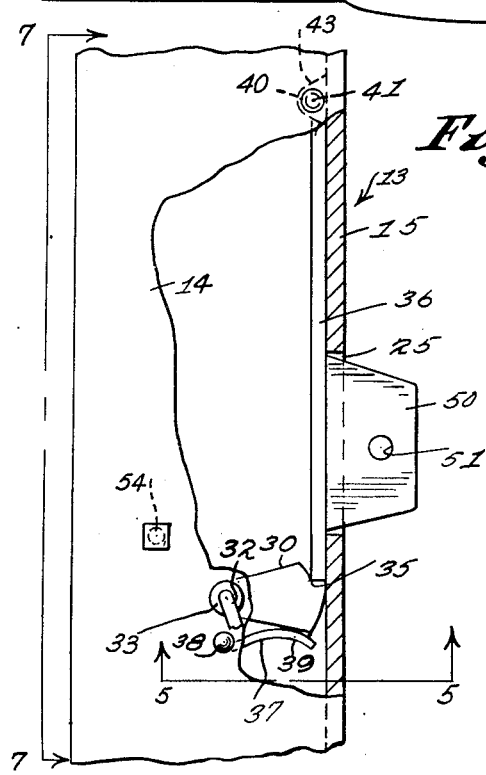
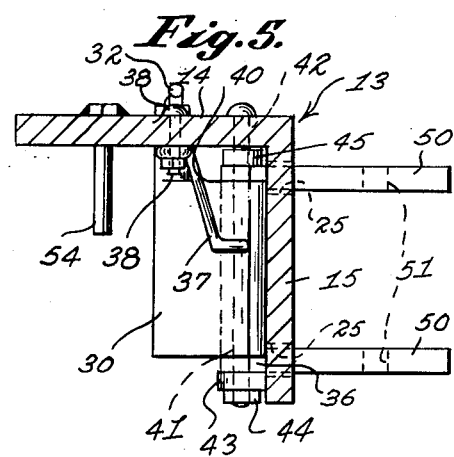
INVENTOR.
Joseph A. Schlenz
BY
McMorrow, Berman & Davidson
ATTORNEYS

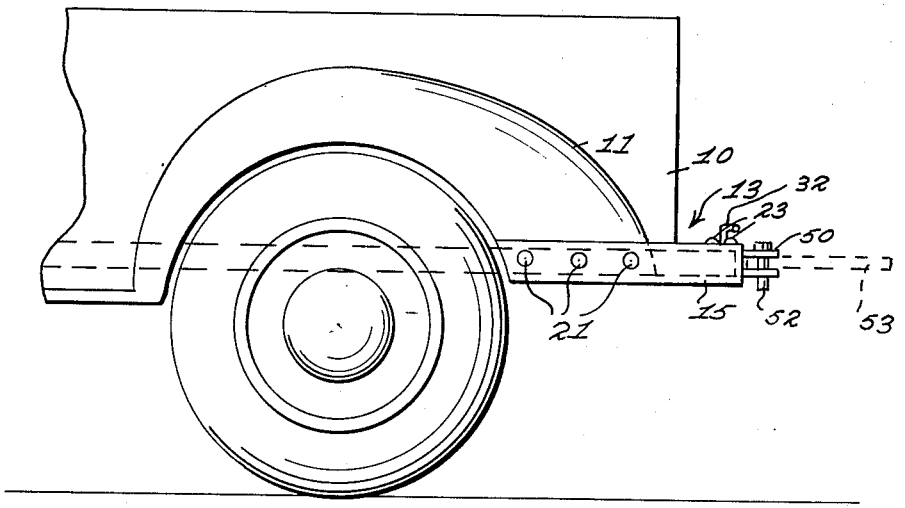
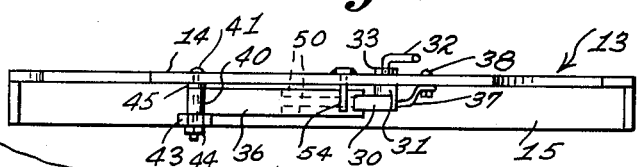

Patented Oct. 24, 1950

2,527,155

UNITED STATES PATENT OFFICE 2,527,155

HITCH FOR TRAILERS

Joseph A. Schlenz, Boys Town, Nebr.

Application August 17, 1948, Serial No. 44,650

4 Claims. (Cl. 280—33.44)

This invention relates to hitches for trailers.

An object of the invention is the provision of a hitch for trailers incorporated in a specially constructed rear bumper for trucks, the bumper being constructed of angle iron and bent at the ends thereof for attachment to the rear fender of the truck with elongated parallel slots formed in the vertical flange of said angle iron, a swingable plate pivoted on the flanges of the angle iron and having parallel tongues adapted to be projected through the slots, a latch retaining the plate in an operative position so that when a coupling pin is inserted through passages in the tongues and the free end of a drawbar of a trailer, said trailer will be attached securely to the truck.

A further object of the invention is the provision of a specially constructed rear bumper which serves not only as a protection brace for the rear fenders of a truck, but provides a housing and a support for a hinged hitch plate having spaced tongues adapted to project through slots in the bumper so that a coupling pin may be received by aligned openings in the tongues and the free end of a drawbar of a trailer, when not in use, the plate being swung inwardly and away from the inner face of the bumper to withdraw the tongues from the slots.

The invention is best understood from a consideration of the following detailed description in connection with the accompanying drawings. Nevertheless, it is to be understood that the invention is not confined to the disclosure, but is susceptible of such changes and modifications as shall define no material departure from the salient features of the invention as expressed in the appended claims.

In the drawings:

Figure 1 is a fragmentary plan view of a truck showing my bumper and an incorporated trailer hitch applied thereto;

Figure 2 is a fragmentary side view of the truck with the bumper and hitch in position;

Figure 3 is a rear end view of the truck showing my bumper in position with parallel slots through which are projected the attaching elements of the hitch;

Figure 4 is an enlarged horizontal section of the bumper disclosing the trailer hitch in an operative position;

Figure 5 is an enlarged transverse vertical section taken along the line 5—5 of Figure 4;

Figure 6 is a fragmentary plan view similar to Figure 4, but showing the hitch in an inoperative position;

Figure 7 is an elevational view on a reduced scale taken substantially on the plane of the line 7—7 of Figure 4, and showing the bumper apart from the rest of the structure;

Figure 8 is a fragmentary longitudinal vertical sectional view taken substantially on the plane of the line 8—8 of Figure 1.

Referring more particularly to the drawings, 10 designates a truck body having rear fenders 11. Brackets 12 extending from the rear end of the body are attached rigidly thereto.

A bumper 13 which is especially constructed is formed of an angle iron bar having a horizontal part or flange 14 and a vertical part or flange 15. It will be noted from Figure 1 that the opposite ends 16 of the bumper are curved and bent inwardly against the rear end of the fenders. Furthermore, the horizontal flange 14 at these curved positions are cut away, as at 17, while the ends of such flange are cut to conform to the contour or curvature of said fenders to provide a neat fit at 20. The fitted ends of the flange 14 are bolted at 21 to the fenders. The wider rear portion 22 of the horizontal flange 14 is bolted at 23 to the free ends of the brackets 12. The intermediate portion of the flange 15 of the bumper is provided with a pair of spaced horizontal slots 25 (Figures 3 and 4).

A trailer hitch (Figures 4 and 5) is incorporated in the bumper 13. This hitch includes a latch dog 30 extending radially of a stem 31 below the flange portion 22. A reduced upper portion of stem 31 extends upwardly through the flange portion 22 and is pivoted therein. The free end of such reduced stem portion is radially directed to provide an actuating handle 32. Any suitable collar 33 may be detachably fixed to the reduced stem above flange portion 22 to retain the latch in position. The free end of the latch dog is formed with a notch 35 to receive the free vertical edges of a vertically-disposed hitch plate 36 which is arranged in confronting relationship with respect to the vertical part of flange 15 of the bumper 13. A spring 37 has one end secured by a bolt 38 threaded into a passage in the flange 14 adjacent the latch handle 32 and parallel to said stem thereof. Said spring extends downwardly at an acute angle to the flange 14 and includes a curved spring arm 39 engaging a rear face of the latch dog 30. The spring arm 39 loads latch dog 30 for pivotal movement in a counter-clockwise direction, Figure 4. When hitch plate 36 is in the advanced or operative position of Figure 4, the notch 35 engages the free end edge of the plate 36 and locks said plate in the advanced position.

The opposite end of plate 36 is mounted for swinging movement about a vertical axis into and out of confronting relation with respect to the vertical part of flange 15 of the bumper 13, said end having a vertically-disposed sleeve 40 receiving a bolt 41. The bolt is inserted through a passage 42 in the flange 14 and a passage in an ear 43 which is welded to the inner face of the vertical flange 15 of the bumper 13. A nut 44 threaded onto the bolt 41 retains said bolt in place. A washer 45 is carried by the bolt and is disposed between the upper end of the sleeve 40 and the under surface of the flange 14. The plate 36 is formed with at least one hitch-providing portion 50 which is advanceable and retractable through at least one opening 25 formed in the bumper 13. In the embodiment shown, there are a pair of spaced parallel hitching tongues 50 which are welded at their inner end edges to one face of the hinged plate 36 adjacent the free end edge thereof. These tongues are tapered and are adapted to be projected through a pair of parallel horizontal slots 25 in the vertical flange 15 of the bumper 13 when the plate is swung to the operative position, Figures 4 and 5. Each tongue 50 has an opening 51 with the openings being in vertical alignment to receive a coupling pin 52 of a drawbar 53 on a trailer.

When the truck is traveling without transporting a trailer, the plate 36 will have been moved to the retracted or inoperative position indicated in broken lines, Figure 6. The tongues 50 are then retracted inwardly of the parallel slots 25 in the bumper flange 15. In such retracted position, latch spring arm 39 pivots the latch into engagement with free front corners of the tongues 50 whereby to lock the hitch plate 36 in the retracted position against any suitable stop pin 54 fixed to and depending from the horizontal flange 14 of the bumper.

When it is desired to hitch a trailer to the truck, the plate 36 is moved from the dotted line position to the full line position illustrated in Figure 4, whence the free end of the latch 30, which has been forced downwardly by the free end of the plate 36 against the tension of the spring 37, will return so that the notch 35 in said latch will receive the free end of the plate and retain said plate in position.

The plate 36 will shift the integrally-formed tongues 50 through the slots 25. The free end of the drawbar 53 is moved into position between the parallel tongues 50 and the coupling pin 52 is inserted through the aligned openings 51 in the tongues and through the opening in the drawbar.

The angle iron serves a double purpose. It not only acts as a bumper, but serves as a protective brace for the fenders. The angle iron provides also a housing for the hitch while supporting the same in such a manner that the iron bears the burden of the trailer.

What is claimed is:

1. In a trailer hitch, a bumper formed of an angle iron having a vertical flange provided with a pair of elongated slots, a hitch plate, means pivotally connecting one end of said plate to said vertical flange of said angle iron so that said plate may move into flat contact with the vertical flange, spaced tongues rigid with the plate and adapted to be projected through the slots, the outer projected end of the tongues having passages to receive a coupling pin of a trailer drawbar, the other flange of the angle iron extending horizontally over the plate in protective relation thereto, and a latch pivoted on the horizontal flange and engageable with the free end of the plate for retaining said plate in contact with the vertical flange, said plate being movable to an inoperative position away from the vertical flange for withdrawing the tongues from the slots and for having said tongues below the horizontal flange of the angle iron bumper.

2. A trailer hitch comprising a flat plate, tongues projecting laterally from one end of the plate, a vehicle bumper forming a support and housing for the plate and tongues when said plate has been swung to an inoperative position, means for hingedly mounting the other end of the plate on the bumper, said tongues being provided with means for attachment to a trailer drawbar, and a releasable means for retaining the plate in an operative position, said bumper having slots through which the tongues are projected when said plate is in an operative hitching position.

3. In a trailer hitch, a bumper including a vertical part, a vertically-disposed hitch plate arranged in confronting relationship with respect to said vertical part and having one end of said plate mounted for swinging movement about a vertical axis into and out of confronting relation with respect to said vertical part, means on the confronting face of said hitch for receiving a coupling pin of the trailer drawbar projectible and retractible through said vertical part, and latch means carried by said bumper and engageable with the other end of said plate when said means is in projected position for retaining said plate in confronting relation with respect to said vertical part.

4. In a trailer hitch, a bumper including a vertical part, a vertically-disposed hitch plate arranged in confronting relationship with respect to said vertical part and having one end of said plate mounted for swinging movement about a vertical axis into and out of confronting relation with respect to said vertical part, means on the confronting face of said hitch plate for receiving a coupling pin of a trailer drawbar projectible and retractible through said vertical part, and latch means carried by said bumper engageable with the upper end of said plate when said means is in projected position for retaining said plate in confronting relation with respect to said vertical part and engageable with the adjacent end of said means when the latter means is in retracted position for retaining said plate out of confronting relation with respect to said vertical part.

JOSEPH A. SCHLENZ.

REFERENCES CITED

The following references are of record in the file of this patent:

UNITED STATES PATENTS

| Number | Name | Date |
|---|---|---|
| 2,309,850 | Klawitter | Feb. 2, 1943 |
| 2,408,531 | Riemann et al. | Oct. 1, 1946 |
| 2,425,838 | Schultz | Aug. 19, 1947 |